(12) United States Patent
Rembach et al.

(10) Patent No.: US 12,176,738 B1
(45) Date of Patent: Dec. 24, 2024

(54) SYSTEM FOR RECOVERING INERTIAL ENERGY

(71) Applicants: Paul F. Rembach, Cypress, TX (US); Don Leslie Bockhorn, Lago Vista, TX (US)

(72) Inventors: Paul F. Rembach, Cypress, TX (US); Don Leslie Bockhorn, Lago Vista, TX (US)

( * ) Notice: Subject to any disclaimer, the term of this patent is extended or adjusted under 35 U.S.C. 154(b) by 0 days.

(21) Appl. No.: 18/141,606

(22) Filed: May 1, 2023

Related U.S. Application Data

(63) Continuation of application No. 16/366,585, filed on Mar. 27, 2019, now abandoned, which is a continuation-in-part of application No. 16/290,202, filed on Mar. 1, 2019, now abandoned.

(60) Provisional application No. 62/636,937, filed on Mar. 1, 2018.

(51) Int. Cl.
*H02J 7/00* (2006.01)
*E21B 19/00* (2006.01)
*H02J 7/02* (2016.01)

(52) U.S. Cl.
CPC .......... *H02J 7/0013* (2013.01); *E21B 19/008* (2013.01); *H02J 7/02* (2013.01)

(58) Field of Classification Search
CPC .................................................. E21B 19/008
See application file for complete search history.

(56) References Cited

U.S. PATENT DOCUMENTS

| | | | | |
|---|---|---|---|---|
| 5,342,020 A | * | 8/1994 | Stone | E21B 19/08 254/269 |
| 5,712,456 A | * | 1/1998 | McCarthy | B66B 1/28 187/289 |
| 9,080,428 B1 | * | 7/2015 | Rembach | E21B 3/022 |
| 10,938,215 B1 | * | 3/2021 | Rembach | H02J 7/345 |
| 2008/0203734 A1 | * | 8/2008 | Grimes | E21B 19/08 290/40 R |
| 2009/0176417 A1 | * | 7/2009 | Rembach | B63J 3/02 440/6 |
| 2009/0195074 A1 | * | 8/2009 | Buiel | H02J 3/28 307/48 |
| 2011/0148209 A1 | * | 6/2011 | Williams | H02J 7/34 307/75 |
| 2013/0271083 A1 | * | 10/2013 | Williams | H02J 3/381 320/128 |
| 2014/0330489 A1 | * | 11/2014 | Sakamoto | E02F 9/2075 701/50 |
| 2016/0056644 A1 | * | 2/2016 | Bae | H02J 7/0013 320/134 |
| 2018/0034280 A1 | * | 2/2018 | Pedersen | H02J 3/38 |
| 2018/0123384 A1 | * | 5/2018 | Foo | H02J 7/0068 |
| 2018/0366950 A1 | * | 12/2018 | Pedersen | H02J 3/46 |
| 2020/0091564 A1 | * | 3/2020 | Moen | H01M 10/6567 |
| 2020/0169088 A1 | * | 5/2020 | Myers | H02J 7/34 |
| 2021/0107616 A1 | * | 4/2021 | Pedersen | H02J 9/06 |

(Continued)

*Primary Examiner* — Drew A Dunn
*Assistant Examiner* — Tynese V McDaniel
(74) *Attorney, Agent, or Firm* — Nolte Lackenbach Siegel

(57) ABSTRACT

A system for recovering and storing inertial energy from an apparatus for lifting and lowering objects, and a method of using the system. The system converts inertial energy to electricity and uses the electricity to charge battery banks. The system can handle high rates of energy transfer, is easily scalable, and can be configured in a portable enclosure.

17 Claims, 2 Drawing Sheets

(56) References Cited

U.S. PATENT DOCUMENTS

2022/0196753 A1\*  6/2022  Tong ................... H02J 7/0069
2022/0340248 A1\* 10/2022  Pedersen ............ E21B 41/0007

\* cited by examiner

Element Index
8: System
10: Isolation/decoupler
12: Inverter
14a-14j: Direct current voltage amplitude converter/charging units
15: Direct current bus
16: Master controller
18a-18j: Batteries
19a-19j: Battery banks
20: Direct current power supply
22: Alternating current power supply
30: Alternating current bus
32a-32c: Generators
34a-34d: Variable frequency drives
36: Alternate power source
40a-40d: Loads

SYSTEM FOR RECOVERING INERTIAL ENERGY

CROSS REFERENCE TO RELATED APPLICATIONS

This is a continuation of, and claims priority to and the benefit of, co-pendinq U.S. application Ser. No. 16/366,585, filed Mar. 27, 2019, titled "SYSTEM FOR RECOVERING INERTIAL ENERGY"; which was a Continuation in Part of, claimed priority to and the benefit of, U.S. application Ser. No. 16/290,202 filed on Mar. 1, 2019, titled "SYSTEM FOR RECOVERING INERTIAL ENERGY"; which in turn claimed priority to U.S. Provisional Patent Application Ser. No. 62/636,937 filed on Mar. 1, 2018, titled "DIGITAL POWER FOR CIRCUIT FOR OIL-GAS DRILLING RIGS". These references are incorporated herein in their entirety and for all purposes, including the purposes of priority.

FIELD

The present disclosure generally relates to a system and method for recovering and storing kinetic energy from at least one apparatus which lift and lower objects.

BACKGROUND

In apparatus such as cranes, elevators, and drilling rigs, heavy loads must often be lifted and lowered. Whenever a large weight is being lowered, inertial kinetic energy must be dissipated in order to decelerate the load. In specific situations, three megawatts or more per second of energy may need to be dissipated.

A typical method of dissipating this energy is to utilize a brake resistor. The load is used to mechanically actuate a generator (such as a braking chopper), which generates electricity that flows through the brake resistor and is dissipated as heat.

This leads to inefficiencies and significant energy wastage during operations. Especially in applications such as drilling an oil well, where diesel generators are often used for a drawworks, this can result in greater environmental impact and fuel consumption.

By recovering at least a portion of the energy typically dissipated as heat and utilizing a storage system for later use can greatly increase efficiency, reduce costs, and fuel/power consumption.

Prior art solutions have attempted to capture and store this energy in batteries, flywheels, supercapacitors, or other similar devices. These solutions are either inefficient, or incapable of handling high bursts of energy transferred in a short period of time. Further, many prior art devices require complex control schema and/or connections to existing equipment. When prior art solutions have been utilized, their inability to scale to accommodate either high rates of transfer and/or store large mounts of energy results in much recoverable energy being dumped.

The present disclosure provides a system and method for recovering and storing kinetic energy from apparatus which lift and lower objects, wherein the system is able to accommodate high rates of energy transfer, scale to accommodate storage requirements, and connect to equipment without integrating controls schema or affecting the operation of equipment.

BRIEF DESCRIPTION OF THE DRAWINGS

The detailed description will be better understood in conjunction with the accompanying drawings as follows.

Figure 1:
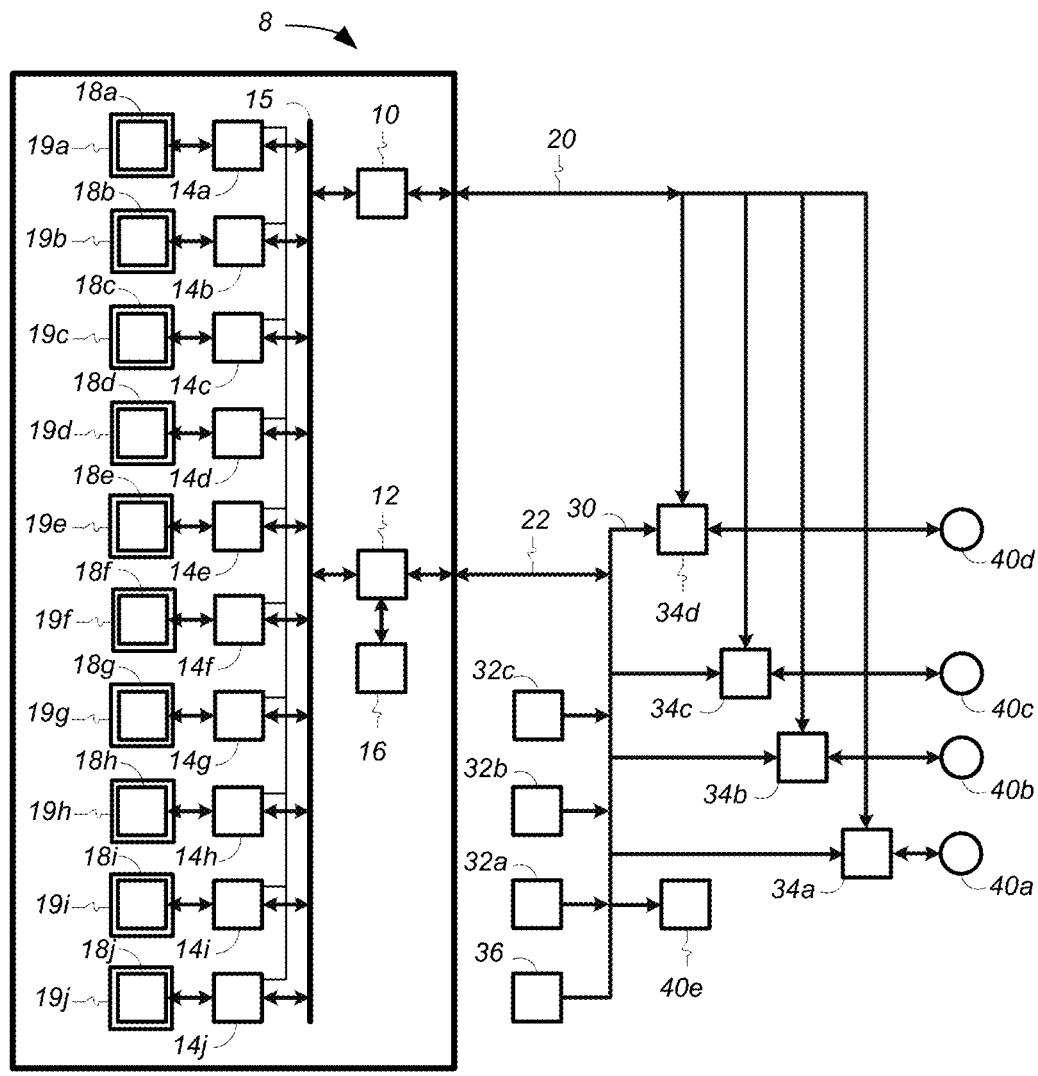
FIG. 1 depicts a schematic embodiment of the system.

The embodiments of the present disclosure are detailed below with reference to the listed Figures.

DETAILED DESCRIPTION OF THE EMBODIMENTS

Before explaining the present disclosure in detail, it is to be understood that the disclosure is not limited to the specifies of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The word "about", when referring to values, means plus or minus 5% of the stated number.

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

When methods are disclosed or discussed, the order of the steps is not intended to be limiting, but merely exemplary unless otherwise stated.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge: or exemplary, procedural or other details supplementary to those set forth herein.

The embodiments of the present disclosure generally relate to a system and method for recovering and storing kinetic energy from at least one apparatus which lift and lower objects, wherein the system is able to accommodate high rates of energy transfer.

The system for recovering inertial energy comprises: a power output from an apparatus for lifting and lowering objects, a plurality of battery banks in electronic communication with the power output, wherein each battery bank is connected in parallel, and further wherein each battery bank comprises at least one battery, and an energy output.

Excess energy dissipated by the apparatus for lifting and lowering objects is converted to electrical energy and stored within one or more battery of the plurality of battery banks, or selectively provided as needed.

Many apparatuses are used to lift heavy objects in industry. Exemplary structures include, but are not limited to cranes, elevators, scissor lifts, drawworks, derricks, gantries, hoists, jacks, pulleys, winches, windlasses, and the like.

When lowering heavy loads, the inertial energy of the load is typically dissipated using various means. On common method is to generate electricity using the kinetic energy of the load to generate electricity, which is passed through a resistor, often referred to as a brake resistor, to be dissipated as heat. The connections to the brake resistor provide a convenient power output to recover otherwise wasted energy.

The present system comprises a plurality of battery banks in communication with such a power output (or other similar means of outputting electricity from an apparatus) to store the energy generated by the load and outputted by an apparatus. The arrangement of the battery banks and simple connection to the apparatus further eliminates the need to have a wired interface with the power generation system of the apparatus.

The term battery, as used herein, refers to any electrochemical or electrical energy storage device. Exemplary devices can include, but are not limited to: rechargeable batteries, flow batteries, capacitors, supercapacitors, superconducting magnets, fuel cells, electrochemical accumulator cells, and the like.

Exemplary rechargeable batteries can include lead acid batteries, nickel cadmium batteries, nickel metal hydride batteries, lithium ion batteries, lithium ion polymer batteries, and the like.

Supercapacitor refers to the family of electrochemical capacitors that do not have conventional solid dielectrics. Supercapacitors are also often referred to as ultracapacitors by persons having ordinary skill in the art.

The term battery as used herein can also refer to supercapacitors working in conjunction with rechargeable batteries in order to store energy.

Each battery and each battery bank can be connected in parallel. Within the battery bank, the batteries can be arranged as required by the application. In embodiments, the batteries are lower voltage than the power source for the apparatus for lifting and lowering objects. This allows the batteries to handle high rates of energy transfer from the apparatus, as lower voltage batteries dramatically increase exposure of the battery storage plates.

The batteries being connected in parallel also allow for easy scalability of the system. Additional battery banks can be added, or battery banks removed as needed. In embodiments, the battery banks can be removed from the system and taken to a remote location for charging and reconnected to the system.

The parallel connection of the batteries also allows for independent operation of each bank. By using a master controller to determine when electrical energy is stored within the plurality of battery banks and when electrical energy is outputted from the battery banks, multiple actions can be accomplished.

One or more battery banks can be charged while other battery banks are providing power as needed. Further, each battery bank can age independently, thereby eliminating the need to replace all batteries at once. This also allows for different types of batteries to be utilized as needed.

By utilizing the arrangement of the present disclosure, the system can be scaled to accommodate virtually any energy transfer rate, thereby eliminating the "power dumping" performed by prior art systems when the energy transfer rate is too high.

When the apparatus for lifting and lowering objects uses an alternating current power supply, the system can be in electronic communication with the power output through an inverter. In embodiments, the inverter can be self-synchronizing to the alternating current power supply in order to optimally supply power as needed. The inverter can also connect to the alternating current power supply through safety devices to allow for trouble-free disconnection from the client system for safety or maintenance.

When the apparatus for lifting and lowering objects uses a direct current power supply, the system can be in electronic communication with the power output through an isolation/decoupler in order to keep the system's direct current power separate from that of the apparatus.

In embodiments, both an inverter and an isolation/decoupler can be utilized.

The system can make use of a direct current bus to communicate with an inverter, an isolation/decoupler, or both. The direct current bus of the system allows for easy connection and/or disconnection of battery banks and/or batteries in parallel.

Each battery bank can be in electronic communication with a direct current voltage amplitude converter/charging unit (DCP). Use of the direct current voltage amplitude converter/charging unit can simplify interfacing the present system with the apparatus for lifting and lowering objects. The DCP can regulate the system's direct current bus voltage, isolate the system direct current bus from the apparatus direct current bus, monitor charge levels of the batteries, and allow for bi-directional power flow to and from the batteries. The DCP can interface with a master controller for monitoring or control of the present system.

Each battery can be less than 100 volts. Typically, batteries from 12 volts to 48 volts are utilized, but persons having ordinary skill in the art can choose the appropriate voltage based upon the specific application.

The present system also allows for a method of storing and providing energy generated by an apparatus for lifting and lowering objects comprising: providing a plurality of battery banks, wherein each battery bank comprises at least one battery, connecting each battery bank to a direct current charging unit, connecting each battery bank in parallel through the direct current voltage amplitude converter/charging unit to a direct current bus, communicating with a direct current power supply for the apparatus for lifting and lowering objects through an isolation/decoupler and/or communicating with an alternating current power supply for the apparatus for lifting and lowering objects through an inverter, providing a master controller to manage a charge on each battery at a specified level, determine when to charge each battery, and determine when to provide energy to the apparatus for lifting and lowering objects.

FIG. 1 depicts a schematic embodiment of the system.

The system 8 can be in electronic communication with a direct current power supply 20 via an isolation/decoupler 10. The system can also be in communication with an alternating current power supply 22 via an inverter 12. A master controller 16 can be co-located with the inverter 12. The system can have a direct current bus 15 engaging the isolation/decoupler 10 and the inverter 12.

The system. can comprise a plurality of direct current voltage amplitude converter/charging units 14a-14j in electronic communication with the direct current bus 15 and batteries 18a-18j. While ten batteries are shown in this embodiment, persons having ordinary skill in the art can add or remove batteries as needed for specific applications. In the illustrated embodiment, each of the batteries 18a-18i comprises a respective battery bank 19a-19i, although other embodiments may employ a plurality of batteries in any given battery bank.

Also shown are a typical arrangement at an oil rig, comprising a plurality of generators 32a-32c and a plurality of variable frequency drives 34a-34d. In embodiments, a common alternating current bus 30 can communicate with the load 40a-40e. In embodiments, an alternate power source 36 can also be utilized.

The master controller can monitor the charge on each battery and maintain a user defined level of charge. Persons having ordinary skill in the art can determine the level of charge in order to prevent over charging of the system, as well as to allow the system to accept the cyclical energy produced.

Figure 2:
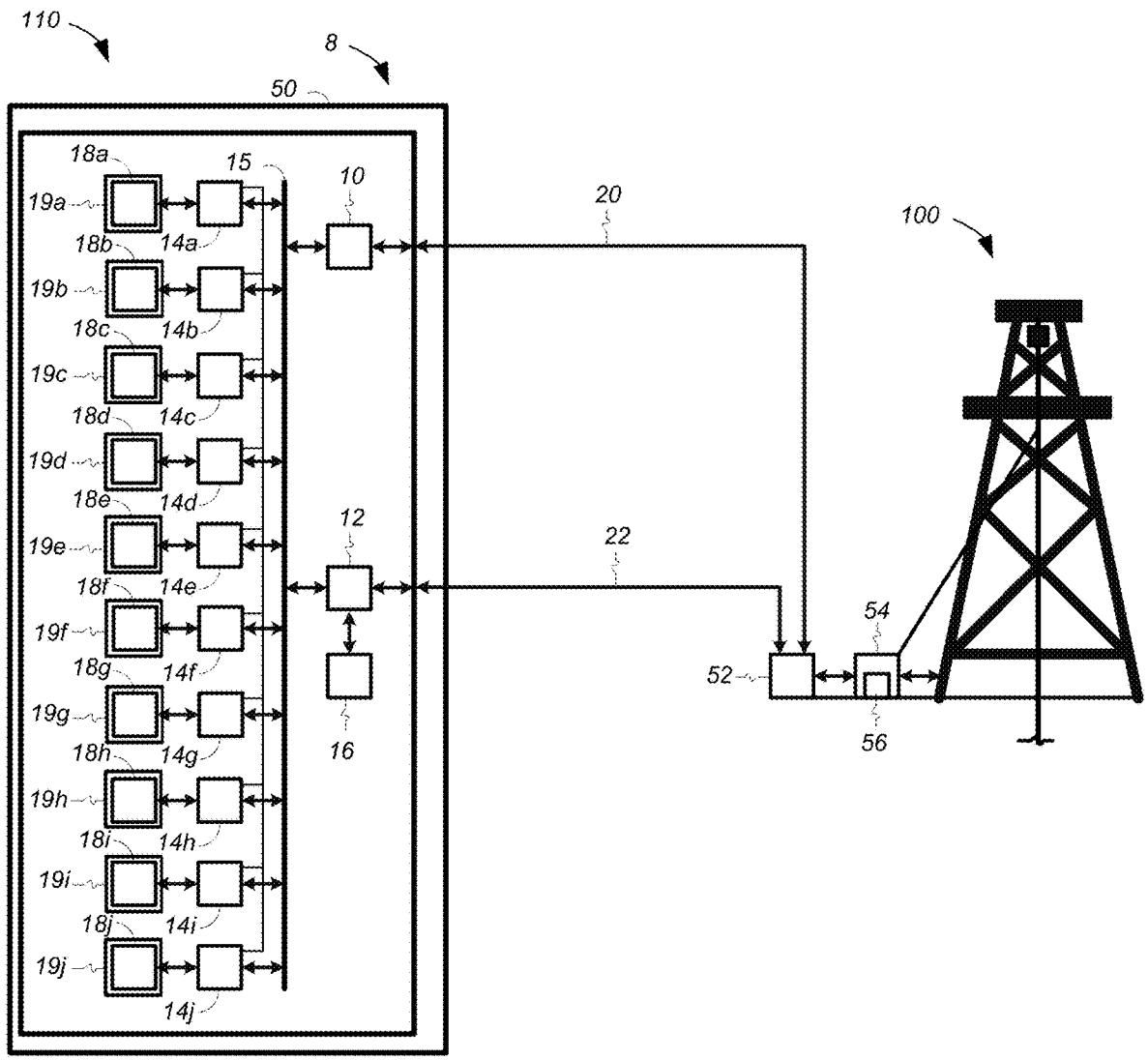
FIG. 2 depicts a schematic of a portable self-contained unit as used with a drilling rig.

FIG. 2 depicts a schematic of a portable self-contained unit as used with a drilling rig.

The portable self-contained unit 110 comprises the system 8, which is placed within a housing 50, such as a shipping container. The system 8 can connect to a drilling rig 100 through a controller 52 and a drawworks 54 of the drilling rig. The drawworks includes an alternating current power supply 56.

EXAMPLE EMBODIMENT

A drilling rig is lowering a drill string. Drilling equipment such as the drawworks (vertical crane), or top drive generate significant amounts of inertial energy that is presently uncaptured, or inefficiently captured. Using the drawworks as an example, as the drill string is lowered, inertial energy must be removed from the drill string in order to safely control its descent.

Typically, a dynamic braking system is used to generate electricity from the mechanical energy and flow the electricity through resistors to dissipate it as heat. The present system takes the place of the resistors by accepting and storing the electrical energy. Due to the exceptionally heavy loads handled by the drawworks, the amount of energy generated is significant. Energy of two megawatts per second or more can be generated by removing inertial energy from the drill string.

An exemplary two thousand horsepower drawworks may employ a dynamic braking system which generates over one and a half megawatts per second for durations of up to ten seconds.

As the drill string goes deeper, more and more inertial energy must be removed at each stage. This energy can be captured and stored using the systems and methods presently disclosed.

As drilling rigs are often in remote locations, the stored energy can be used in lieu of energy generated utilizing diesel fuel or gasoline generators. The system can be scaled to accommodate the amount of energy generated, and used to power emergency, ancillary, or safety systems. In embodiments, the batteries can be taken off site, charged at a lower cost than available on site, and replaced in the system.

The system can easily be designed with rack mounted components, allowing for a compact, simple, and portable design. The simplicity of the connections to the rig allow for quick and easy disconnection to relocate, use with another rig, or retrofit to an existing rig. The control schema of the drilling rig need not be interfered with, leading to a truly plug and play solution.

While the present disclosure emphasizes the presented embodiments and Figures, it should be understood that within the scope of the appended claims, the invention might be practiced other than as specifically enabled herein.

What is claimed is:

1. A system for recovering inertial energy from a drawworks of a drilling rig, comprising:
    a plurality of battery banks connected in parallel to store direct current ("DC") electrical energy received in parallel;
    a DC bus;
    an isolation/decoupler in electrical communication with the plurality of battery banks through the DC bus that, in use, receives DC electrical energy from the drilling rig, the DC electrical energy having been converted from alternating current ("AC") electrical energy generated from the kinetic energy of the drawworks of the drilling rig, and transmits the received DC electrical energy in parallel to the plurality of battery banks for storage at energy transfer rates exceeding 1.5 MW/see; and
    an inverter in electrical communication with the plurality of battery banks through the DC bus that, in use, receives stored DC electrical energy from the plurality of battery banks in parallel, converts the stored DC electrical energy to AC electrical energy, and transmits the converted AC electrical energy to the drilling rig.

2. The system of claim 1, further comprising a master controller to determine when:
    electrical energy is stored within the plurality of battery banks; and
    the stored DC electrical energy is converted to AC electrical energy and the converted electrical energy is transmitted to the drilling rig.

3. The system of claim 2, wherein the system is self-contained and not a part of the drilling rig.

4. The system of claim 1, wherein:
    the drawworks comprises an alternating current power supply; and
    the plurality of battery banks is in electronic communication with the alternating current power supply through the inverter.

5. The system of claim 1, further comprising a master controller to manage a charge on each battery bank at a specified level, determine when to charge each battery, and determine when to output energy.

6. The system of claim 1, wherein each battery bank of the plurality of battery banks is in electrical communication with a DC voltage amplitude converter/charging unit.

7. The system of claim 1, wherein each battery is less than 100 volts.

8. The system of claim 1, further comprising the drilling rig, the drilling rig including the drawworks.

9. The system of claim 8, wherein the system excluding the drilling rig is self-contained and not a part of the drilling rig.

10. The system of claim 1, wherein the system is self-contained and not a part of the drilling rig.

11. The system of claim 1, wherein each battery bank further comprises at least one battery, or at least one capacitor, or a combination thereof.

12. A method of storing inertial energy converted to electrical current energy generated by a drilling rig, the method comprising:
providing a plurality of battery banks;
connecting each battery bank to a direct current ("DC") voltage amplitude converter/charging unit;
connecting each battery bank in parallel through a respective one of the DC voltage amplitude converter/charging units to a DC bus;
communicating between the DC bus and an alternating current ("AC") power supply for the drilling rig through an inverter;
communicating between the DC bus and a DC power output of the drilling rig through an isolation/decoupler; and
providing a master controller to manage a charge on each battery at a specified level, determine when to charge each battery bank at energy transfer rates exceeding 1.5 MW/sec through the isolation/decoupler, and determine when to output energy through the inverter.

13. The method of claim 12, wherein the power output from the drilling rig is output by the drawworks and the converted inertial energy into stored electrical energy is provided to the drilling rig.

14. The method of claim 12, wherein each battery bank comprises at least one battery, or at least one capacitor, or a combination thereof.

15. A method for selectively converting kinetic energy dissipated by a drawworks of a drilling rig to stored electrical energy when the drawworks is lowered and selectively provide the stored electrical energy to the drilling rig, the method comprising:
receiving direct current ("DC") electrical energy from the drilling rig at energy transfer rates exceeding 1.5 MW/see, the DC electrical energy having been converted from alternating current ("AC") electrical energy generated from the kinetic energy of the drawworks of the drilling rig;
transmitting the received DC electrical energy in parallel over a DC bus to a plurality of battery banks for storage at energy transfer rates exceeding 1.5 MW/see;
inverting the stored DC electrical energy from the battery banks to produce AC electrical energy; and
delivering the produced AC electrical energy over a single line to the drilling rig.

16. The method of claim 15, wherein each battery bank further comprises at least one battery, or at least one capacitor, or a combination thereof.

17. A system, comprising:
a drilling rig including;
a drawworks; and
a variable frequency drive that, in use, raises and lowers the drawworks; and
a self-contained unit, including:
a battery bank, the battery bank including a plurality of batteries, or capacitors, or a combination of batteries and capacitors;
a direct current ("DC") bus;
an isolation/decoupler in electrical communication with the battery bank through the DC bus that, in use, receives DC electrical energy from the drilling rig, the DC electrical energy having been converted from alternating current ("AC") electrical energy generated from the kinetic energy of the drawworks of the drilling rig, and transmits the received DC electrical energy in parallel to the battery bank for storage at energy transfer rates exceeding 1.5 MW/see;
an inverter in electrical communication with the battery bank through the DC bus that, in use, receives stored DC electrical energy from the battery bank, converts the stored DC electrical energy to AC electrical energy, and transmits the converted AC electrical energy to the drilling rig; and
a master controller selectively charging the plurality of batteries in the battery bank through the isolation/decoupler from the converted DC electrical energy and selectively providing the stored DC electrical energy to the drilling rig through the inverter.

\* \* \* \* \*